(12) United States Patent
Zeiss et al.

(10) Patent No.: US 6,312,773 B1
(45) Date of Patent: Nov. 6, 2001

(54) FRONT FRAME AND METHOD FOR PRODUCING IT

(75) Inventors: Manfred Zeiss, Rüsselsheim; Dieter Klübenspies, Kelkheim; Thomas Ritter, Alzenau, all of (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/519,133

(22) Filed: Mar. 6, 2000

(30) Foreign Application Priority Data

Mar. 9, 1999 (DE) ................................. 199 10 282

(51) Int. Cl.⁷ ....................................................... A47G 1/12
(52) U.S. Cl. ................. 428/13; 428/14; 428/31; 428/76; 428/542.2
(58) Field of Search ................... 428/31, 13, 14, 428/76, 192, 542.2; 280/727, 781; 296/70, 72

(56) References Cited

U.S. PATENT DOCUMENTS

| | | | |
|---|---|---|---|
| 4,447,860 | * | 5/1984 | Stone et al. ............................ 362/30 |
| 4,954,807 | * | 9/1990 | Fleischer et al. ..................... 340/459 |
| 5,387,023 | * | 2/1995 | Deneau .................................. 296/72 |
| 5,406,303 | * | 4/1995 | Salmon et al. ......................... 345/75 |
| 5,430,612 | * | 7/1995 | Simon et al. ........................ 361/752 |
| 5,678,912 | * | 10/1997 | Ayres et al. ............................ 362/23 |

FOREIGN PATENT DOCUMENTS

| | | |
|---|---|---|
| 4321711 | 1/1994 | (DE) . |
| 19617498 | 11/1997 | (DE) . |
| 19654415 | 6/1998 | (DE) . |
| 2740422 | 4/1997 | (FR) . |

* cited by examiner

*Primary Examiner*—Deborah Jones
*Assistant Examiner*—Abraham Bahta
(74) *Attorney, Agent, or Firm*—Martin A. Farber

(57) ABSTRACT

A combination instrument (1) has a front frame (2) having a cover (7) which has a plurality of recesses (4, 5) for indicating instruments or other displays. The cover (7) is covered with a decorative element which is formed as a molding (3) and around which a section (8), which is designed as an undercut, of the front frame (2) grips. To this end, the front frame (2) is produced in an injection molding process, the molding (3) being placed into the injection mold. The connection of the molding (3) to the front frame (2) can take place such that it is invisible to someone looking at it, thereby enabling an attractive, visual appearance and simultaneously reliable way of fixing it to be achieved.

11 Claims, 1 Drawing Sheet

FRONT FRAME AND METHOD FOR PRODUCING IT

FIELD AND BACKGROUND OF THE INVENTION

The invention relates to a front frame which is intended for a combination instrument, in particular of a vehicle, and has a cover forming a boundary around a display of the combination instrument, the cover being at least partially covered with a decorative element. The invention furthermore relates to a process for producing a front frame of this type.

Front frames of the abovementioned type are used in today's motor vehicles and are therefore known. The front frame of the combination instrument is covered with respect to the passenger compartment by means of a covering window. The cover has a plurality of apertures for indicating instruments, digital displays or warning lights which are arranged on a rear instrument carrier.

The cover is at least partially covered with the decorative element, which is merely painted in a contrasting color in a simple design or, in the case of more complicated embodiments, can, in addition to purely structural elements, also be provided with imprints which assist in improving the functionality or the readability of the combination instrument or in facilitating the understanding of the display. For this purpose, the decorative element is provided, for example, with a coating or an imprint.

A disadvantage here is that the decorative element has to be positioned exactly with respect to the display. Because the decorative element is arranged in the driver's permanent field of vision, even the smallest deviations can be seen and therefore convey an inferior impression of the combination instrument. The observation of small tolerances, which is required in order to avoid deviations of this type, is associated here with a considerable outlay on production.

In other combination instruments the decorative element is designed as a printed film which has to be stuck onto the cover in a further operation. In this case, the film has to be cut out very exactly and laid carefully, since otherwise projecting lengths and gaps are produced. In particular, the outer edges of the film should not protrude over the cover. A further disadvantage here is that the film shows signs of aging over the course of time which may lead to the formation of folds and cracks, for example, but also to the film becoming detached from the cover.

SUMMARY OF THE INVENTION

The invention is based on the problem of providing a front frame of the type mentioned at the beginning in such a manner that the decorative element can be arranged on the cover without any problem and without a significant outlay on production. The intention here is, in particular, to prevent folds or cracks, which lead to an inferior impression. The intention is furthermore to provide a process for producing a front frame of this type.

The problem mentioned first is solved according to the invention by the decorative element being a molding which is connected to the front frame. By this means, the decorative element can be premanufactured independently of the front frame and subsequently needs merely to be connected to the front frame. In comparison with a film, the molding is considerably less problematic to handle and makes exact positioning possible, for example, by use of fitting pins. By selecting a suitable material, which can also take place in this case irrespective of the material of the front frame, signs of aging or damage due to strong sunlight are also prevented. To this end, the molding can also be manufactured from a metal and designed as a carrier of components, for example, a flat liquid crystal display. The formation as a separate molding means that any painting or coating which may be required can at the same time be done substantially more simply, in particular separately from the remaining components of the combination instrument.

A particularly simple development of the invention is provided here if the molding is connected to the front frame with a force fit. To this end, the molding can be bonded, for example to the front frame or the cover, and thereby makes rapid installation possible. At the same time, the molding can be used in order to reinforce the combination instrument and can also replace the cover in subregions.

Another particularly advantageous embodiment of the invention is provided if the molding is connected to the front frame with a form fit. This enables tolerance values, which facilitate the installation in particular, to be provided in a simple manner. At the same time, different thermal expansions can be compensated for, so that deformation of the combination instrument does not occur, for example in the case of direct sunlight.

In this connection, a particularly simple development of the invention is provided by the molding being connected to the front frame by means of a clip connection. This means that a special tool is not required in order to install the molding and so, for example, even retrofitting of the molding in the case of existing and appropriately prepared combination instruments is easily possible, and so an individual design appropriate to the user's tastes is possible.

To this end, it is particularly advantageous if the molding is connected to the front frame in a detachable manner. This enables the molding to be easily exchanged in the event of possibly being damaged, for one thing, and also, for another thing, should there be a change to the customer's specification or in order to complement an existing cover. This exchange does not require a garage visit; rather, it can be carried out by the customer himself.

A development of the invention is particularly well-suited to this end, in which the molding has an edge region which is surrounded by the front frame. The edge region of the molding is therefore invisible to someone looking at the combination instrument. Possible manufacturing tolerances are therefore insignificant for the visual appearance. For this purpose, the front frame may, in particular, also have a circumferential groove in the form of an undercut into which the molding can be inserted with a form fit and so, for example, is at the same time designed as a clip connection.

Another particularly advantageous development of the invention is also achieved if the molding has a boundary surface which is adjacent to the display and is inclined toward it. This boundary surface, which is desirable for structural considerations, makes possible a visually attractive boundary around the display in a similar manner to a passe-partout. For this purpose, the boundary surface, which is also known as the tube frame, can protrude in particular into a recess in the cover and can have a contrasted coloring.

To this end, a particularly effective development is provided by the boundary surface enclosing the display essentially in a funnel-shaped manner. As a result, in addition to a visually attractive impression, simple centering of the funnel-shaped boundary surface within the corresponding recess in the cover can be achieved at the same time.

The second problem mentioned, of providing a process for producing a front frame which is intended for a combination instrument, in particular of a vehicle, and has a cover forming a boundary around a display of the combination instrument, the cover being at least partially covered with a decorative element, is solved according to the invention by the decorative element first of all being premanufactured as a molding, subsequently being placed into the injection mold and finally the front frame being injected in such a manner that a front section of the front frame grips around an edge region of the molding. This enables the front frame to be produced and connected to the molding in a joint operation. This results in a connection which is either force-fitting or form-fitting and which can also, for example, be detached. Because of the section of the front frame which fits around the edge region of the molding, the connection is invisible to someone looking at it, and so a satisfactory appearance can easily be achieved. In this case, the outlay on production is comparatively low.

A particularly advantageous development of the process according to the invention is provided here if the molding is first of all produced in a thermoforming process. The molding already obtains a high degree of inherent stability thereby. At the same time, the shaping enables the molding to be positioned without any problem during the following injection molding process.

A particularly simple development of the process is provided by the front frame being integrally connected to the cover in the injection molding process. This enables a further reduction in the outlay on manufacturing. In this case, the additional molding is essentially used for the visual appearance, while the cover as a component part of the combination instrument is also used at the same time as a structural element.

BRIEF DESCRIPTION OF THE DRAWING

The invention permits various embodiments. To further clarify its basic principle one of these is illustrated in the figures of the drawing and is described below. In the drawing

DETAILED DESCRIPTION OF THE PREFERRED EMBODIMENT

Figure 1:
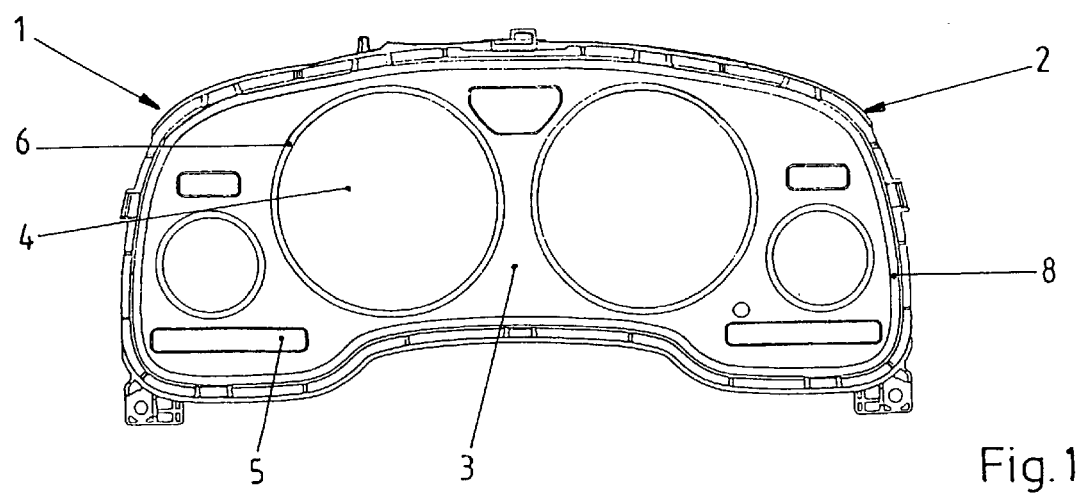
FIG. 1 shows a front view of a combination instrument having the front frame according to the invention.
Figure 2:
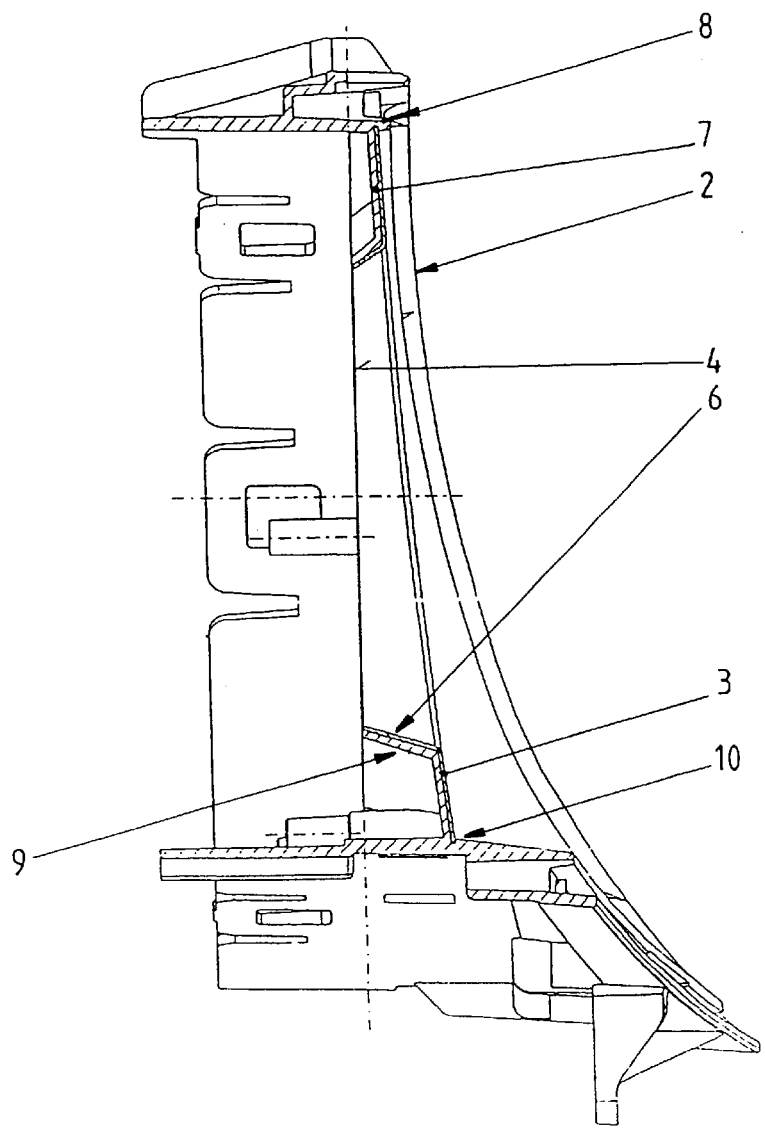
FIG. 2 shows a cutaway side view of the front frame of the combination instrument.

FIG. 1 shows, in a front view, a combination instrument 1 having a front frame 2 and a molding 3, which is designed as a decorative element and which covers a cover 7, which is shown in FIG. 2. The molding 3 bounds a plurality of recesses 4 for indicating instruments (not illustrated) and further recesses 5 for displays (likewise not illustrated) of the combination instrument 1. To this end, the molding 3 in each case has a beveled boundary surface 6 which is adjacent to the recesses 4, 5 and, in addition to improved optics, can also be used in order to position the molding 3 on the cover 7, which is shown in FIG. 2. The molding 3 is furthermore fixed to the front frame 2 by means of a peripheral section 8 which is designed as an undercut and grips around an invisible edge region of the molding 3 with a form fit.

FIG. 2 shows, in a sectional illustration, a side view of the front frame 2 of the combination instrument 1, which is shown in FIG. 1. The cover 7, which is connected integrally to the front frame 2 and which is covered by the molding 3, can be seen. The sloping boundary surface 6 of the molding 3 is adjacent to the recess 4 for an indicating instrument (not shown) and rests on a correspondingly shaped bent portion 9 of the cover 7. For fixing purposes, the molding 3 has an edge region 10 around which the section 8, which is formed as an undercut, of the front frame 2 grips, so that the molding 3 is retained with a form fit in a manner which is invisible to someone looking at it. This formation of the molding 3 enables the combination instrument 1 to be manufactured in a simple manner by the premanufactured molding 3 being placed, during the injection molding process of the front frame 2, into the injection mold and being injection molded from behind and (in the region of the section 8 which is formed as the undercut) being encapsulated by injection molding, forming the front frame 2. In this case, the molding 3 can serve merely as a decorative element carrier and also has an information carrier. For this purpose, the molding 3 can be produced from any materials desired and can also, for example, have transparent sections.

That section 8 of the front frame 2 which encloses the molding 3 results in the molding 3 being satisfactorily positioned, there being the option at the same time of compensating for manufacturing tolerances or thermal expansions. Depending on the design of the section 8, the molding 3 can also be connected to the front frame 2 in a detachable manner or else, by elastic deformation of the section 8, can be fixed in a manner corresponding to a clip connection.

We claim:
1. A front frame which is intended for a combination instrument for a vehicle, comprising
   a cover forming a boundary around a display of the combination instrument,
   a decorative element at least partially covering the cover, wherein
   the decorative element is a molding (3) which is connected to a front frame (2).
2. The front frame as claimed in claim 1, wherein said molding (3) is connected to the front frame (2) with a force fit.
3. The front frame as claimed in claim 1, wherein the molding (3) is connected to said front frame (2) with a form fit.
4. The front frame as claimed in claim 1, wherein the molding (3) is connected to said front frame (2) by a clip connection.

5. The front frame as claimed in claim 1, wherein the molding (3) is detachably connected to said front frame (2).

6. The front frame as claimed in claim 1, wherein the molding (3) has an edge region (10) which is surrounded by said front frame (2).

7. The front frame as claimed in claim 1, wherein said molding (3) has a boundary surface (6) which is adjacent to the display and is inclined toward it.

8. The front frame as claimed in claim 7, wherein the boundary surface (6) has essentially a funnel-shape and encloses the display.

9. An injection molding process for producing a front frame for a combination instrument according to claim 1, having a cover forming a boundary around a display of the combination instrument, the cover being at least partially covered with a decorative element, the process comprising the steps of first of all premanufacturing the decorative element as a molding, subsequently placing it into an injection molds and finally injecting the front frame in such a manner that a front section of the front frame grips around an edge region of the molding.

10. The injection molding process as claimed in claim 9, wherein first of all the molding is produced in a thermoforming process.

11. The injection molding process as claimed in claim 9, wherein the front frame is integrally connected to the cover in the injection molding process.

* * * * *